UNITED STATES PATENT OFFICE.

IRA R. BURNS, OF BELLWOOD, PENNSYLVANIA.

EMBALMING FLUID.

No. 835,781.         Specification of Letters Patent.         Patented Nov. 13, 1906.

Application filed December 12, 1905. Serial No. 291,399.

*To all whom it may concern:*

Be it known that I, IRA R. BURNS, a citizen of the United States, residing at Bellwood, in the county of Blair and State of Pennsylvania, have invented certain new and useful Improvements in Embalming Fluids, of which the following is a specification.

My invention relates to improvements in embalming fluids, and has particular reference to a fluid for embalming and preserving the dead, the object being the production of a fluid which will be a perfect disinfectant, preservative, and bleacher and which may be manufactured at a comparatively low price.

In the production of one gallon of my embalming fluid I use the following ingredients, combined in the proportions stated: boracic acid, three ounces; soda, one-fourth ounce; arsenic, one-fourth ounce; alcohol, eight ounces; nitrate of soda, two and one-half ounces; glycerin, one-fourth ounce; chloral hydrate, two ounces; formaldehyde solution, two ounces, and corrosive sublimate, one ounce. The ingredients may preferably be measured according to parts by weight.

In compounding the above ingredients the solids enumerated are pulverized, mixed with three and one-half quarts boiling water, and allowed to stand until cool. Then alcohol and corrosive sublimate or bichlorid of mercury are added, and the final result is a fluid which insures perfect embalming of the dead.

I claim—

1. An embalming fluid comprising boracic acid, soda, arsenic, alcohol, nitrate of soda, glycerin, chloral hydrate, formaldehyde solution, and corrosive sublimate compounded with water substantially as specified.

2. An embalming fluid composed of three parts boracic acid, one-fourth part soda, one-fourth part arsenic, eight parts alcohol, two and one-half parts nitrate of soda, one-fourth part glycerin, two parts chloral hydrate, two parts formaldehyde solution, and one part corrosive sublimate, combined with water.

In testimony whereof I affix my signature in presence of two witnesses.

IRA R. BURNS.

Witnesses:
J. A. MILLER,
JOHN C. OSWALT.